(12) United States Patent
Kaller et al.

(10) Patent No.: US 8,040,253 B2
(45) Date of Patent: Oct. 18, 2011

(54) LANE-CHANGE ASSISTANT FOR MOTOR VEHICLES

(75) Inventors: Jochen Kaller, Yokohama (JP); Dieter Hoetzer, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 12/227,384

(22) PCT Filed: May 9, 2007

(86) PCT No.: PCT/EP2007/054486
§ 371 (c)(1),
(2), (4) Date: Nov. 13, 2008

(87) PCT Pub. No.: WO2007/144239
PCT Pub. Date: Dec. 21, 2007

(65) Prior Publication Data
US 2009/0102629 A1    Apr. 23, 2009

(30) Foreign Application Priority Data
Jun. 13, 2006 (DE) .......................... 10 2006 027 326

(51) Int. Cl.
*G08G 1/16* (2006.01)
(52) U.S. Cl. ......................... 340/903; 340/435; 342/455
(58) Field of Classification Search ................... 340/435, 340/903, 933; 701/200, 207, 300, 301; 342/455, 342/457, 458
See application file for complete search history.

(56) References Cited

U.S. PATENT DOCUMENTS

| | | | |
|---|---|---|---|
| 7,663,533 B2 * | 2/2010 | Toennesen et al. | 342/70 |
| 7,801,659 B2 * | 9/2010 | Leineweber et al. | 340/435 |
| 2003/0025597 A1 | 2/2003 | Schofield | |
| 2009/0212930 A1 * | 8/2009 | Pfeiffer et al. | 340/435 |

FOREIGN PATENT DOCUMENTS

| | | |
|---|---|---|
| DE | 36 22 091 | 1/1988 |
| DE | 103 45 802 | 4/2005 |
| WO | 2005/073753 | 8/2005 |
| WO | 2006/092431 | 9/2006 |

* cited by examiner

Primary Examiner — Thomas Mullen
(74) Attorney, Agent, or Firm — Kenyon & Kenyon LLP

(57) ABSTRACT

A lane-change assistant for motor vehicles, having a sensor system to locate vehicles on adjacent lanes in the rear space of the own vehicle, a decision module to decide whether a vehicle located in the rear space is on an immediately adjacent lane, and a driver interface to output the decision result, characterized in that a determination module is provided to determine the lane on which the own vehicle is traveling, and the decision module is designed to make the decision as a function of the result of the determination module.

7 Claims, 2 Drawing Sheets

LANE-CHANGE ASSISTANT FOR MOTOR VEHICLES

FIELD OF THE INVENTION

The present invention relates to a lane-change assistant for motor vehicles, having a sensor system for locating vehicles on adjacent lanes in the rear space of the own vehicle, a decision module to decide as to whether a vehicle located in the rear space is traveling on an immediately adjacent lane, and a driver interface to output the result of the decision.

BACKGROUND INFORMATION

Such lane-change assistants are meant to prevent the driver from changing to an adjacent lane if an overtaking vehicle is approaching from behind on this adjacent lane, so that there would be a collision risk or at least an obstruction of the overtaking vehicle. In most cases a rear-space radar is used as sensor system in such lane-change assistants, i.e., a radar sensor which points to the rear or obliquely to the rear and is able to measure the distances, relative velocities and azimuth angles of the located vehicles. The lateral offset of the vehicle is then able to be calculated from the distance and the azimuth angle, and a decision can be made as to the road lane on which the vehicle is traveling. Furthermore, using the distance and the relative velocity, it is calculated whether a change to the adjacent lane is possible without endangering the cars traveling behind. If the decision module determines that a lane change is impossible and, furthermore, if it can be seen, for instance based on the state of the turn signal indicator or based on the steering actions of the driver, that the driver intends to change lanes, then a warning is output to the driver via the driver interface. This warning may take the form of an optical, acoustic or haptic signal. Especially useful is the output of an optical signal by a display device which is integrated in the outside mirror of the vehicle.

In view of traffic safety and the acceptance of the system, the lane-change assistant should be designed in such a way that, for one, unnecessary false warnings are avoided, but, for another, a warning will be output with high reliability in an actual dangerous situation. For this it is necessary to make a reliable decision as to whether the located vehicle is indeed traveling on the immediately adjacent left neighboring lane (in countries using right-hand traffic). This decision is difficult because the position-finding signals of the sensor system include error tolerances. If no video system having an electronic image-evaluation device is available in the vehicle with whose aid the road markings on the pavement are directly detectable, then there is the additional problem that the precise width of the road lanes is not known and can only be estimated. As a result, there may be doubtful cases in which it is not clear whether the located vehicle is on the adjoining left lane but stays relatively to the right within this lane, or whether the vehicle is on the own lane and is traveling at a relatively wide left offset with respect to the own vehicle. Similar doubtful cases also exist in the assignment of the located vehicle to the immediately adjacent lane or the one-after-the-next lane. If the road curves, then this decision becomes even more complicated. To solve this latter problem, U.S. 2003/0025597 A1 proposes to record the history of the roadway path.

SUMMARY OF THE INVENTION

It is an object of the exemplary embodiments and/or exemplary methods of the present invention to further improve the reliability of the lane-change assistant.

According to the exemplary embodiments and/or exemplary methods of the present invention, this object is achieved by the features described herein in that a determination module is provided to determine the road lane on which the own vehicle is traveling, and the decision module is designed to make the decision as a function of the result of the determination module.

It has been shown that the frequency of false warnings is able to be reduced considerably and, on the other hand, the omission of actually required warnings is able to be avoided in many cases if it is known and taken into account in the decision module on which lane of the multi-lane directional roadway the own vehicle is located. If, for instance, the own vehicle is traveling on the second lane from the left, then no one-after-the-next lane exists. This means that vehicles that are located relatively far to the left of the own vehicle must clearly be on the immediately adjacent lane. On the other hand, if the own vehicle itself is driving on the outermost left lane, then there is no chance for the following vehicles to overtake so that warnings should be suppressed under all circumstances, in particular also if a lane-change intention of the driver is erroneously inferred because the driver has actuated the left turn signal indicator for some other reason. In this way it is possible to avoid a large percentage of the false warnings that previously occurred in lane-change assistants.

Advantageous embodiments of the present invention are described herein.

One example of a device for determining the road lane on which the own vehicle is traveling is discussed in DE 103 45 802 A1. However, within the scope of the present invention, any known and suitable device may be used for this purpose.

If the vehicle is equipped with a video system for monitoring the area in front of the vehicle, its data may be utilized to determine the own lane. In practice, vehicles that are equipped with a lane-change assistant usually also have an ACC system (adaptive cruise control), in which the area in front of the vehicle is monitored using a radar sensor pointing forward, and which is used to locate preceding vehicles and to regulate the distance of the own vehicle with respect to the immediately preceding vehicle automatically. In this case, it is possible to determine how many lanes there are and on which lane the own vehicle is situated by statistical evaluation of the lateral offsets of preceding, overtaking vehicles or vehicles that have been overtaken. As an alternative or in addition, the data of the rear-space radar may also be utilized for such a statistical evaluation. If the vehicle is equipped with an advanced navigation system whose digital map includes information about the number of driving lanes of the roadway traveled, then at least the total number of existing lanes of the directional roadway is also able to be determined with the aid of the navigation system. Given sufficient spatial resolution of the associated GPS system and sufficient accuracy of the digital map, the own lane is also able to be determined directly with the aid of the navigation system.

Since it is also possible to measure the relative velocities of the located objects with the aid of a radar sensor, e.g., the ACC radar or the rear-space radar, stationary objects along the road such as guardrail posts and the like, are able to be identified, so that information regarding the overall width of the roadway is obtained in this manner. If the number of driving lanes is known in addition, then it is also possible to calculate the width of an individual lane with relatively high accuracy. This information in turn makes it possible to assign the vehicles located in the rear space to the various road lanes with higher reliability. In this way the accuracy of the decision module is able to be improved especially also in situations where two or more adjacent lanes are available on the left.

The designations "left" and "right" in this specification and also in the patent claims apply exclusively to countries having right-hand traffic. For countries having left-hand traffic, these designations must be exchanged.

An exemplary embodiment of the present invention is illustrated in the drawing and explained in greater detail in the following description.

DETAILED DESCRIPTION

Figure 1:
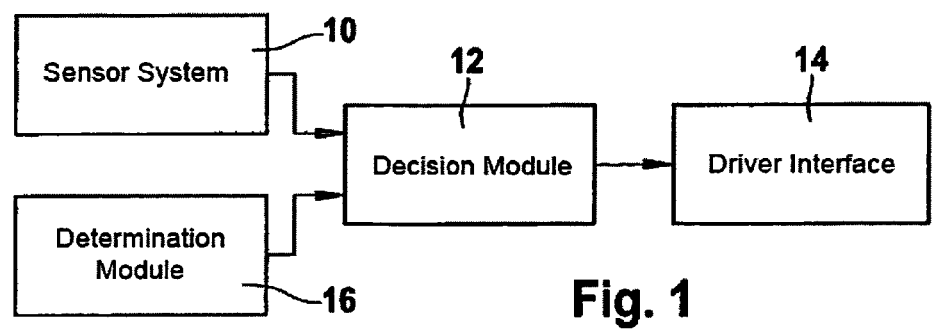
FIG. 1 shows a block diagram of a lane-change assistant according to the present invention.

The lane-change assistant shown in FIG. 1 includes a sensor system 10, such as a rear-space radar, to locate vehicles and other objects in the rear space of the own vehicle, a decision module 12 to decide whether a vehicle located by the rear-space radar is traveling on the directly adjacent left lane or on another lane, and a driver interface 14 to output a warning to the driver as a function of the decision result of decision module 12.

As usual with lane-change assistants, the decision made by decision module 12 is not only dependent upon the lane assignment of the located vehicle, but also upon the measured distance and the relative velocity of this vehicle. In most cases the output of a warning to the driver will occur only if it is detectable based on the traffic situation or based on actions of the driver such as the actuation of the turn signal indicator, steering actions and the like, that the driver intends to change lanes. Devices for detecting such a lane-change intention of the driver are known as such and not described further in this context. Decision module 12, which processes the various data and generates the instruction to output the warning, is designed in the known manner in the form of an electronic data-processing system having appropriate software.

The lane-change assistant according to the present invention also has a determination module 16, which uses known methods to determine on which lane of a multi-lane directional roadway the own vehicle is located. This information is made available to decision module 12 and analyzed there, as is going to be elucidated in the following text on the basis of FIGS. 2 through 4.

Figure 2:
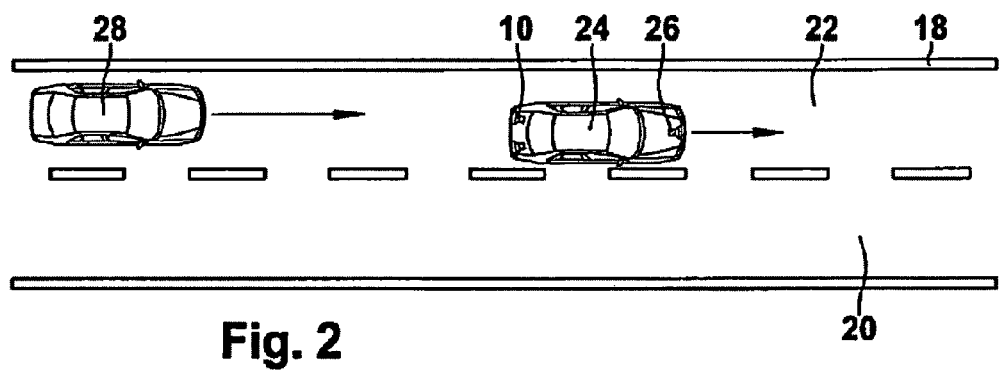
FIG. 2 shows a sketch to elucidate the method of operation of the lane-change assistant in different traffic situations.

FIG. 2 shows a two-lane directional roadway 18 having a right lane 20 and a left lane 22. The own vehicle 24, which is equipped with the lane-change assistant according to FIG. 1, is driving on the outermost left lane 22. Sensor system 10 is symbolized by two rear-space radar sensors in vehicle 24. In addition, an ACC radar sensor 26 is sketched, which monitors the area in front of vehicle 24.

On left lane 22, vehicle 24 is followed by a vehicle 28, which is approaching at a higher speed. The speeds of the vehicles are symbolized by arrows. Vehicle 28 is driving at a slight left offset with respect to own vehicle 24. As a result, it is not readily possible to make a decision solely on the basis of the data from sensor system 10 as to whether vehicle 28 is located on the same lane as vehicle 24 or whether it is on an adjacent left lane. If it were situated on an adjacent left lane, then there would be an acute collision danger due to the high speed of vehicle 28, and if a lane-change intention by the driver is to be inferred in addition, for instance because the driver has set the left turn signal indicator for some reason, then a warning to the driver would be imperative.

However, determination module 16 supplies decision module 12 with the information that own vehicle 24 is already located on the outermost left lane 22 so that there is neither the possibility of a lane change to the left for the driver of own vehicle 24 nor a possibility for vehicle 28 to overtake. In such a situation decision module 12 may therefore decide with certainty that vehicles 24 and 28 are on the same lane, so that no warning is output to the driver.

Figure 3:
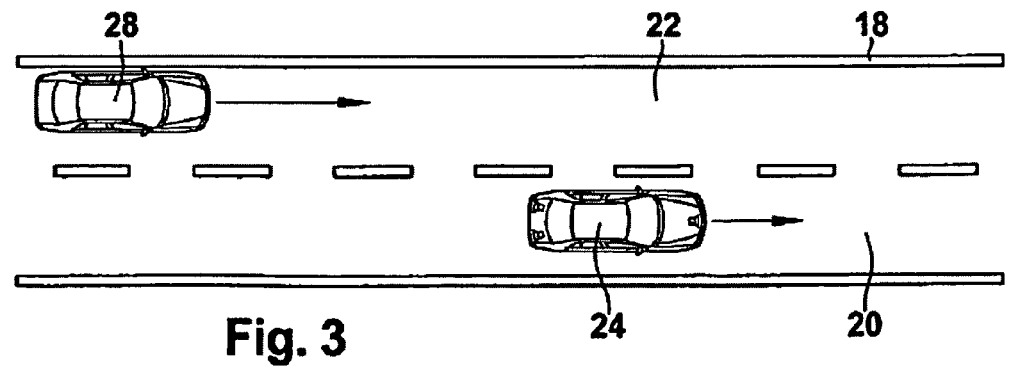
FIG. 3 shows a sketch to elucidate the method of operation of the lane-change assistant in different traffic situations.

The situation illustrated in FIG. 3 first of all differs from the situation according to FIG. 2 by the fact that own vehicle 24 is now located on right lane 20. Furthermore, in this case the following vehicle 28 is driving close to the left edge of left lane 22. Without knowledge of the roadway configuration, it would thus also be possible that vehicle 28 is located in a next-but-one left adjacent lane (which actually does not exist), so that this vehicle would not pose any collision risk. Due to the data of determination module 16, however, it is established that own vehicle 24 is on the right lane of two-lane directional roadway 18, i.e., the second lane from the left, so that there is no further next-but-one left lane. As a result, vehicle 28 must be on the immediately adjacent left lane 22, and a warning must therefore be output to the driver.

Figure 4:
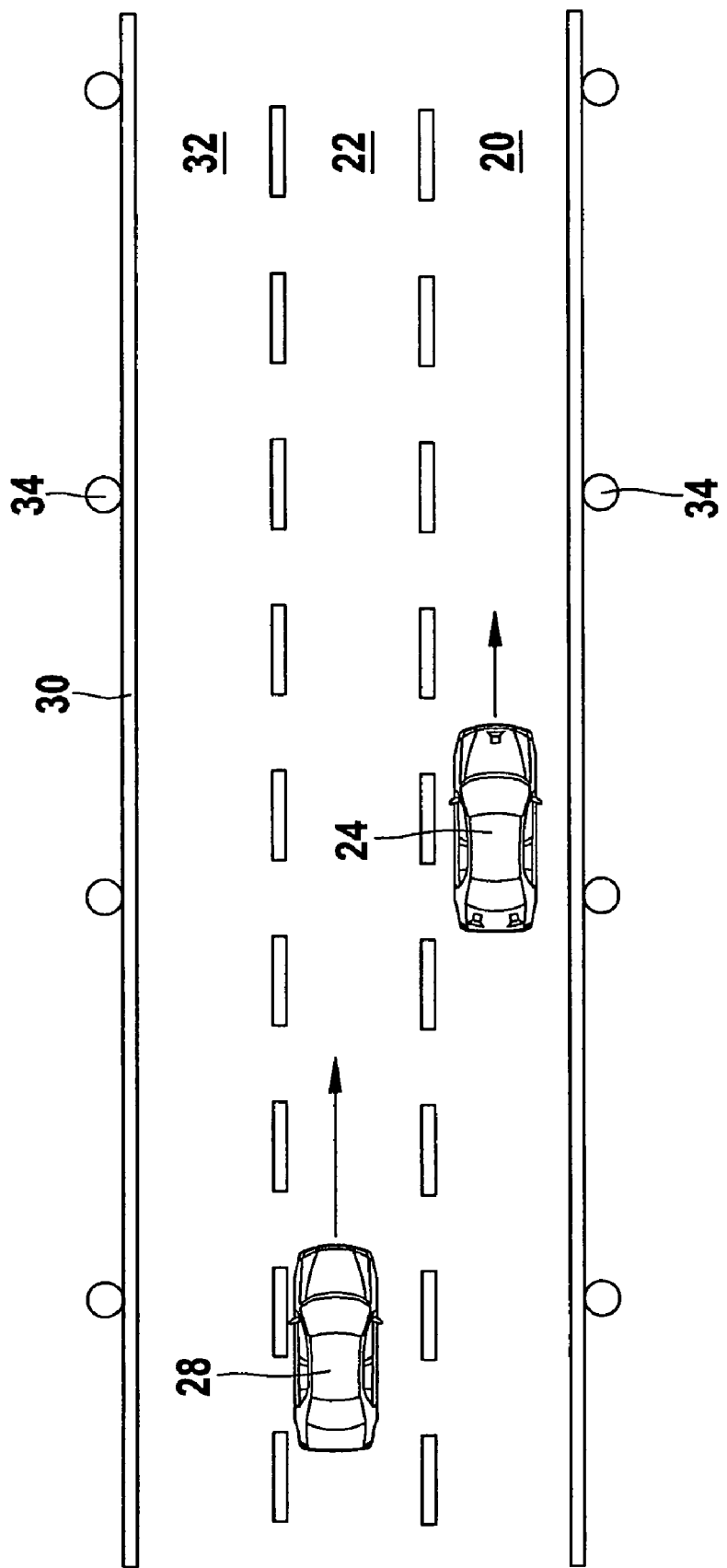
FIG. 4 shows a sketch to elucidate the method of operation of the lane-change assistant in different traffic situations.

FIG. 4 illustrates the same situation as FIG. 3 with the only difference that in this case the vehicles are driving on a directional roadway 30 having three lanes, i.e., left adjacent lane 22 from the viewpoint of vehicle 24 thus is the center lane of the roadway, and an outermost left lane 32 is available in addition. Since vehicle 28 is once again driving with a pronounced offset to the left on lane 22, a decision as to whether this vehicle is located on the immediately adjacent left lane 22 or else on the outermost left lane 32 is difficult to make on the basis of the data of sensor system 10. After all, the information provided by determination module 16 that lane 32 exists still leaves open the possibility that vehicle 28 may be located on this lane 32 so that no warning would need to be output to the driver. However, this does not resolve the ambiguity of the situation, and additional information would be required to make a reliable decision.

However, the information supplied by decision (determination) module 16 about the total number of existing driving lanes offers the possibility of obtaining such additional information. In FIG. 4, stationary guardrail posts 34 have been sketched at the left and right roadway edge. ACC radar sensor 26 is not only able to locate these guardrail posts 34 but, by measuring the relative velocity, also to detect that the absolute velocity of these guardrail posts is equal to zero, i.e., that these are stationary objects, which thus have to be located beyond directional roadway 30. An additional indication is the regular pattern at which these guardrail posts 34 are typically disposed. By measuring the lateral offset of the left and right guardrail posts 34 with the aid of ACC radar sensor 26 or optionally also with the aid of the rear-space radar, it is therefore possible to determine the overall width of directional roadway 30 in the form of a good approximation.

If one divides this overall width by the likewise known number of lanes, then a relatively reliable measure for the width of the individual lanes is obtained. While the lane width determined in this manner may still include errors, it is nevertheless more precise than a purely estimated value. Using this knowledge, a more reliable decision may therefore be made as to whether vehicle 28 is located on the directly left adjacent lane 22 or on the next-but-one adjacent lane 32.

In the example shown, the result is that vehicle 28 is located on the directly adjacent left lane 22, and a warning is output as should be the case. However, if vehicle 28 were driving close to the right edge of outermost left lane 32, then an undesired false warning would be avoided due to the more precise knowledge of the lane width.

What is claimed is:

1. A lane-change assistant for a motor vehicle, comprising:
   a sensor system to locate vehicles on adjacent lanes of a directional roadway in a rear space of the motor vehicle;
   a decision module to provide a decision as to whether a vehicle present in the rear space is on a lane of the directional roadway directly adjacent to a lane on which the motor vehicle is being driven;
   a driver interface to output the decision; and
   a determination module to provide a determination as to the lane of the directional roadway on which the motor vehicle is being driven;
   wherein the decision module is configured to make the decision as a function of the determination of the determination module.

2. The lane-change assistant of claim 1, wherein the determination module detects whether the motor vehicle is located on an outermost left lane of the directional roadway, so that a located vehicle cannot be located on an adjacent left lane.

3. The lane-change assistant of claim 2, wherein the determination module detects whether precisely one adjacent lane is located to the left next to the lane of the directional roadway on which the motor vehicle is being driven, and in instances where it is unclear based on data of the sensor system, whether the located vehicle is on an immediately adjacent lane or on a one-after-the-next adjacent lane, the decision module making a decision that the located vehicle is on the immediately adjacent lane.

4. The lane-change assistant of claim 3, further comprising:
   a sensor device to measure an overall width of the directional roadway on which the motor vehicle is being driven, wherein the determination module determines an overall width and number of lanes of the directional roadway, the decision module determines a width of an individual lane of the directional roadway based on the overall width and the number of lanes of the directional roadway determined by the determination module.

5. The lane-change assistant of claim 1, further comprising:
   a sensor device to measure an overall width of a directional roadway on which the motor vehicle is being driven, wherein the determination module determines an overall width and number of lanes of the directional roadway, the decision module determines a width of an individual lane of the directional roadway based on the overall width and the number of lanes of the directional roadway determined by the determination module.

6. The lane-change assistant of claim 2, further comprising:
   a sensor device to measure an overall width of the directional roadway on which the motor vehicle is being driven, wherein the determination module determines an overall width and number of lanes of the directional roadway, the decision module determines a width of an individual lane of the directional roadway based on the overall width and the number of lanes of the directional roadway determined by the determination module.

7. The lane-change assistant of claim 1, wherein the determination module detects whether precisely one adjacent lane is located to the left next to the lane of the directional roadway on which the motor vehicle is being driven, and in instances where it is unclear based on data of the sensor system, whether the located vehicle is on an immediately adjacent lane or on a one-after-the-next adjacent lane, the decision module making a decision that the located vehicle is on the immediately adjacent lane.

* * * * *